(12) United States Patent
Maus et al.

(10) Patent No.: US 11,473,420 B2
(45) Date of Patent: Oct. 18, 2022

(54) METHOD OF DRILLING A WELLBORE TO A TARGET

(71) Applicant: Magnetic Variation Services, LLC, Denver, CO (US)

(72) Inventors: Stefan Maus, Boulder, CO (US); Marc Ernest Willerth, San Luis Obispo, CA (US); Jarrod Shawn Deverse, Greenwood Village, CO (US)

(73) Assignee: MAGNETIC VARIATION SERVICES, LLC, Denver, CO (US)

( * ) Notice: Subject to any disclaimer, the term of this patent is extended or adjusted under 35 U.S.C. 154(b) by 482 days.

(21) Appl. No.: 16/097,788

(22) PCT Filed: May 11, 2017

(86) PCT No.: PCT/US2017/032295
§ 371 (c)(1),
(2) Date: Oct. 30, 2018

(87) PCT Pub. No.: WO2017/197203
PCT Pub. Date: Nov. 16, 2017

(65) Prior Publication Data
US 2019/0169977 A1 Jun. 6, 2019

Related U.S. Application Data (60) Provisional application No. 62/408,622, filed on Oct. 14, 2016, provisional application No. 62/335,078, filed on May 12, 2016.

(51) Int. Cl.
*E21B 47/02* (2006.01)
*E21B 47/022* (2012.01)
(Continued)

(52) U.S. Cl.
CPC .............. *E21B 47/022* (2013.01); *E21B 7/04* (2013.01); *E21B 44/00* (2013.01); *E21B 47/024* (2013.01); *E21B 47/04* (2013.01)

(58) Field of Classification Search
CPC .............. E21B 7/04; E21B 44/00; E21B 47/02
See application file for complete search history.

(56) References Cited

U.S. PATENT DOCUMENTS 6,405,808 B1 6/2002 Edwards et al.
7,957,946 B2 6/2011 Pirovolou
(Continued)

OTHER PUBLICATIONS

Colombia Patent Application No. NC2018/0012148, "Office Action", dated Dec. 14, 2020, 20 pages with translation.
(Continued)

*Primary Examiner* — Robert E Fuller
*Assistant Examiner* — Lamia Quaim
(74) *Attorney, Agent, or Firm* — Kilpatrick Townsend & Stockton LLP (57) ABSTRACT

A method of drilling a wellbore to a target includes measuring attitudes at two adjacent survey stations along a wellbore using a downhole surveying tool. An actual change in wellbore position over a survey leg linking the two survey stations is determined. Corrections are applied to the measured attitude at one or both of the survey stations such that a modeled well path joining the survey stations reflects the determined actual change in wellbore positon between the two survey stations.

26 Claims, 8 Drawing Sheets

(51) Int. Cl.
  *E21B 47/024* (2006.01)
  *E21B 47/04* (2012.01)
  *E21B 7/04* (2006.01)
  *E21B 44/00* (2006.01)

(56) References Cited

U.S. PATENT DOCUMENTS

| | | | |
|---|---|---|---|
| 8,561,720 B2 | 10/2013 | Edbury et al. | |
| 2002/0060570 A1* | 5/2002 | Shirasaka | E21B 47/022 |
| | | | 324/338 |
| 2012/0330551 A1 | 12/2012 | Mitchell et al. | |
| 2015/0240622 A1 | 8/2015 | Bang et al. | |
| 2016/0032709 A1* | 2/2016 | Ledroz | G01C 19/02 |
| | | | 73/152.54 |

OTHER PUBLICATIONS

International Application No. PCT/US2017/032295, "International Preliminary Report on Patentability", dated Nov. 22, 2018, 9 pages.
Supplementary European Search Report, European Application No. 17796894.8 dated Jan. 27, 2020.
International Search Report and Written Opinion, PCT/US17/32295 dated Aug. 16, 2017.
U.S. Appl. No. 16/192,135, "Non-Final Office Action", dated Oct. 28, 2021, 16 pages.
U.S. Appl. No. 16/192,135, "Notice of Allowance", dated Apr. 11, 2022, 10 pages.
U.S. Appl. No. 16/192,135, "Corrected Notice of Allowability", dated May 4, 2022, 2 pages.
Australian Patent Application No. 2017263539, "First Examination Report", dated Feb. 22, 2022, 3 pages.
Columbian Patent Application No. NC2018/0012148, "Office Action", dated Dec. 14, 2020, 20 pages.
PCT/US2017/032295, "International Preliminary Report on Patentability", dated Nov. 22, 2018, 9 pages.

* cited by examiner

METHOD OF DRILLING A WELLBORE TO A TARGET

CROSS-REFERENCE TO RELATED APPLICATIONS

This application claims the benefit of U.S. Provisional Application No. 62/408,622, filed on 14 Oct. 2016, and U.S. Provisional Application No. 62/335,078, filed on 12 May 2016, both of which are hereby incorporated by reference as if fully set forth herein.

BACKGROUND

In wellbore placement by measurement-while-drilling (MWD), surveys of the inclination and azimuth are taken at regular intervals along the wellbore. Industry standards require that a survey is taken at least every 100 feet. Commonly, a survey is taken every 90 feet, corresponding to the length of a "stand" consisting of three "singles" of drill pipe. In sections with strong curvature ("build-section"), it is common to take surveys every single of drill pipe (30 feet). The wellbore trajectory is then computed by minimum curvature interpolation, which implicitly assumes a circular arc (constant radial arc) between any two adjacent survey stations. Since the true well path between adjacent survey stations is not usually a circular arc, the actual change in position from one survey station to the next is different from the positional change computed by minimum curvature. This problem is well known in the industry. It is a cause of considerable concern because even small errors in vertical depth can lead to significant economic losses due to stranded hydrocarbon resources. To avoid such errors, methods are available to measure or estimate the direction of the wellbore in the intervals between MWD surveys.

One method used to identify wellbore trajectory between MWD surveys includes measuring the wellbore inclination and/or azimuth at many additional points between two stationary surveys. This is called "continuous survey" or "dynamic survey," even though in practice it just employs a higher sampling rate than the actual MWD survey stations. Continuous survey data may include inclination measurements only, or both inclination and azimuth measurements. The wellbore trajectory is then computed by minimum curvature interpolation that assumes a circular arc between any two adjacent points. The more additional data points there are between the stationary surveys, the closer the two adjacent points, and the more accurate the computed wellbore trajectory between the adjacent points may be. However, the use of additional intermediate data points to facilitate better calculation of wellbore trajectory introduces operational complications in many workflows that use directional survey data.

SUMMARY

In one aspect, a method of drilling a wellbore to a target includes measuring attitudes at two adjacent survey stations along a wellbore using a downhole surveying tool. The method further includes determining an actual change in wellbore position over a survey leg linking the two adjacent stations. Corrections are then applied to the measured attitude at one or both of the survey stations such that a modeled well path joining the survey stations reflects the determined actual change in wellbore position between the two survey stations.

In another aspect, a method of drilling a wellbore to a target includes measuring attitudes at two adjacent survey stations along a wellbore using a downhole surveying tool. The method further includes determining an actual change in wellbore position over a survey leg linking the two adjacent stations. Then, a notional survey station is interpolated between the two adjacent survey stations. The interpolation involves computing the attitude of the notional survey station such that two modeled well paths linking the two adjacent survey stations and notional survey station reflect the determined actual change in wellbore position over the survey leg.

In yet another aspect, a method of drilling a wellbore to a target includes measuring attitudes at least at two of consecutive first, second, and third survey stations along a wellbore using a downhole surveying tool. An actual change in wellbore position between the first and third survey stations is determined. Then, corrections are applied to the attitude of the second survey station such that two modeled well paths linking the three survey stations reflect the determined actual change in wellbore position between the first and third survey stations.

BRIEF DESCRIPTION OF DRAWINGS

The following is a description of the figures in the accompanying drawings. The figures are not necessarily to scale, and certain figures and certain views of the figures may be shown exaggerated in scale or in schematic in the interest of clarity and conciseness.

DETAILED DESCRIPTION

Measurement-while-drilling (MWD) survey stations are typically spaced about every 90 feet along the wellbore. Each MWD survey station is characterized by a measured depth, MD, inclination, Inc, and azimuth, Az. Inclination is the deviation of the wellbore from the vertical. Azimuth is the orientation of the wellbore relative to the north. Measured depth is the length of the wellbore. The survey data may be represented by a set of direction vectors D in a North-East-Vertical (NEV) coordinate system. Each direction vector D corresponds to a measured depth, MD, at a survey station and may be expressed as shown in Equation (1) below. (The direction vector D may also be described as the attitude of the corresponding survey station.)

$$D = |\sin(Inc) \cdot \cos(Az), \sin(Inc) \cdot \sin(Az), \cos(Inc)| \quad (1)$$

where:
Inc=inclination
Az=azimuth
D=direction vector or attitude

The most widely used method for computing the well path in the industry is the minimum curvature method, which assumes a circular arc between any two adjacent survey stations with indices n−1 and n. The position coordinates of survey station n−1 are given or known. The position coordinates for survey station n, in terms of Easting, Northing, and True Vertical Depth, are calculated by fitting a circular arc to the two positional vectors. If the well path between two adjacent survey stations n−1 and n is represented by position vectors $P_{n-1}$ and $P_n$, then $$D_n = |\sin(Inc_n) \cdot \cos(Az_n), \sin(Inc_n) \cdot \sin(Az_n), \cos(Inc_n)| \qquad (2A)$$

$$DL_n = \cos^{-1}(D_{n-1} \cdot D_n) \qquad (2B)$$

$$P_n = P_{n-1} + (MD_n - MD_{n-1}) \cdot \tan\left(\frac{DL_n}{2}\right) / DL_n \cdot (D_{n-1} + D_n) \qquad (2C)$$

where:
$D_{n-1}$=direction vector at survey station n−1
$D_n$=direction vector at survey station n
$DL_n$=dogleg angle between attitudes at survey stations n−1 and n
$MD_{n-1}$=measured depth at survey station n−1
$MD_n$=measured depth at survey station n
$P_{n-1}$=position vector at survey station n−1
$P_n$=position vector at survey station n In the case where $DL_n$=0, the expression $\tan(DL_n/2)/DL_n$ in Equation (2C) is replaced by ½.

The standard minimum curvature solution assumes that the entire interval between survey stations n−1 and n will be drilled at a constant radius of curvature. In reality, drilling of the interval will not follow a circular arc. In reality, the true changes in inclination and azimuth will not be distributed along a circular arc over the survey interval between the two adjacent survey stations. This means that the true change in position between the survey stations will be different from the change in position computed by the minimum curvature method (Equations (2A) through (2C)). It is possible to estimate and correct this positional error using additional information on the wellbore trajectory between surveys, such as through continuous surveying or slide sheets. However, in order for such a correction to be operationally viable, it has to fit within the standard wellbore surveying framework that employs minimum curvature representation of the wellbore trajectory.

Figure 4A:
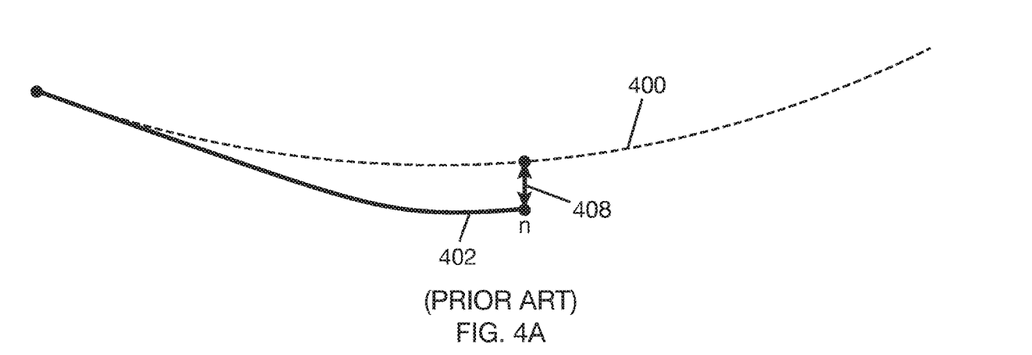
FIG. 4A illustrates minimum curvature solution with standard survey.
Figure 4B:
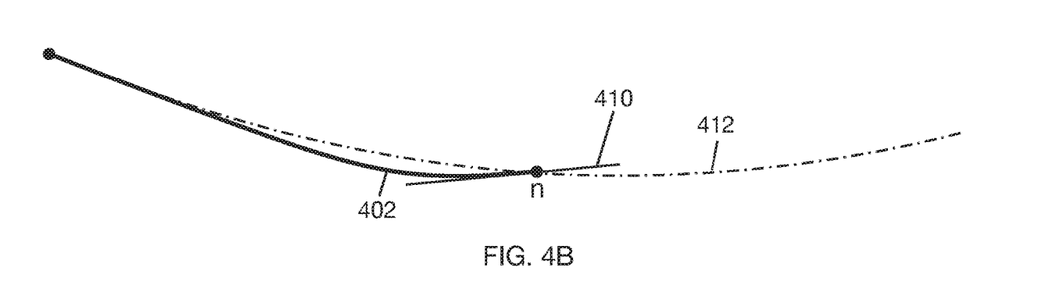
FIG. 4B illustrates minimum curvature solution with corrected survey.

In one embodiment of the present disclosure, a method of correcting wellbore positional error includes applying corrections to the measured attitude at one or both of two adjacent survey stations such that a modeled well path joining the two survey stations reflects the actual change in wellbore position (usually expressed in 3 coordinates, Northing, Easting, and True Vertical Depth) between the two adjacent survey stations. Let the two adjacent survey stations be a previous survey station, n−1, and a current survey station, n. As the terms "previous" and "current" are used, the previous survey station will have a smaller measured depth (MD) compared to the current survey station. For this embodiment, the position vector, $P_n$, at the current survey station is estimated using additional survey information collected between the previous survey station, n−1, and the current survey station, n. Then, corrections to the attitude measured at the current survey station are computed such that the minimum curvature solution matches the estimated position at the current survey station, n. This is in contrast to the standard minimum curvature computation using uncorrected survey data, where the attitude at the current survey station is matched but additional knowledge regarding the position of the current survey station is ignored. FIG. 4A illustrates a standard minimum curvature solution with uncorrected survey 400. The actual well path is shown at 402. Note the error 408 in true vertical depth (TVD) between the trajectory computed by the standard minimum curvature solution 400 and the actual well path 402 at the current survey station, n. FIG. 4B illustrates a minimum curvature solution with corrected survey 412, according to the present disclosure. The actual well path is shown at 402. Note that the corrected survey has eliminated the TVD error at the current survey station, n, with the position of the wellbore trajectory computed by the minimum curvature solution matching the position of the actual well path at the current survey station, n.

For the embodiment described above, the modeled well path linking the two adjacent survey stations is described by Equations (3A) through (3C). Equation (3A) shows the direction vector, $D_n$, at the current survey station, n, with inclination correction, $\delta Inc_n$, to the inclination measured at the current survey station, n, and azimuth correction, $\delta Az_n$, to the azimuth measured at the current survey station, n. In alternate examples, only the measured inclination or only the measured azimuth may be corrected. The term "correction to attitude" will generally mean correction to one or both of the measured inclination and azimuth. The dogleg angle, $DL_n$, and position vector, $P_n$, at the current survey station are given by Equations (3B) and (3C).

$$D_n = |\sin(Inc_n + \delta Inc_n) \cdot \cos(Az_n + \delta Az_n), \qquad (3A)$$
$$\sin(Inc_n + \delta Inc_n) \cdot \sin(Az_n + \delta Az_n), \cos(Inc_n + \delta Inc_n)|$$

$$DL_n = \cos^{-1}(D_{n-1} \cdot D_n) \qquad (3B)$$

$$P_n = P_{n-1} + (MD_n - MD_{n-1}) \cdot \tan\left(\frac{DL_n}{2}\right) / DL_n \cdot (D_{n-1} + D_n) \qquad (3C)$$

where:
$Az_n$=azimuth at current survey station
$Inc_n$=inclination at current survey station
$\delta Inc_n$=correction to inclination at current survey station
$\delta Az_n$=correction to azimuth at current survey station
$D_{n-1}$=direction vector, or attitude, at the previous survey station
$D_n$=direction vector, or attitude, at the current survey station
$DL_n$=dogleg angle between attitudes at the two survey stations
$MD_{n-1}$=measured depth at the previous survey station
$MD_n$=measured depth at the current survey station
$P_{n-1}$=position vector at previous survey station
$P_n$=position vector at the current survey station In the correction in FIG. 4B, note that the well-path vector 410 is not tangent to curve 412 at station n. This is because the correction defines a new survey vector that is tangent to the desired curve, but is not necessarily aligned with the well path. Relaxing this tangent restriction enables proper placement of the well using the circular arc. However, there is value in having the well path close to the tangent lines of the modeled curve 412. The embodiments described below use dual arc optimization to achieve this.

In another embodiment of the present disclosure, a method of correcting wellbore positional error includes applying corrections to the attitude at a notional station interpolated between two adjacent survey stations such that two modeled well paths joining the notional station to each of the two adjacent survey stations reflect the actual change in wellbore position between the two adjacent survey stations. For this embodiment, it is helpful first to consider the effect of interpolating a notional station between two adjacent survey stations, i.e., a previous survey station, n−1, and a current survey station, n, and modeling the interval between the two adjacent survey stations as two circular arcs. If the attitude of the interpolated notional station matches the attitude of the single circular arc linking the two adjacent survey stations, then the final position computed as two circular arcs remains unchanged. If the attitude of the interpolated notional station is changed slightly up or down, left or right, then the final position of the current survey station, n, computed from two circular arcs moves in the same direction. Thus, by selecting the correct attitude for the interpolated notional station, the position of the current survey station, n, as computed by two circular arcs can be made to closely match the estimated position at the current survey station, n. As in the previous embodiment, the position vector, $P_n$, at the current survey station, n, can be estimated using additional survey information collected between the previous survey station, n−1, and the current survey station, n.

Figure 5:
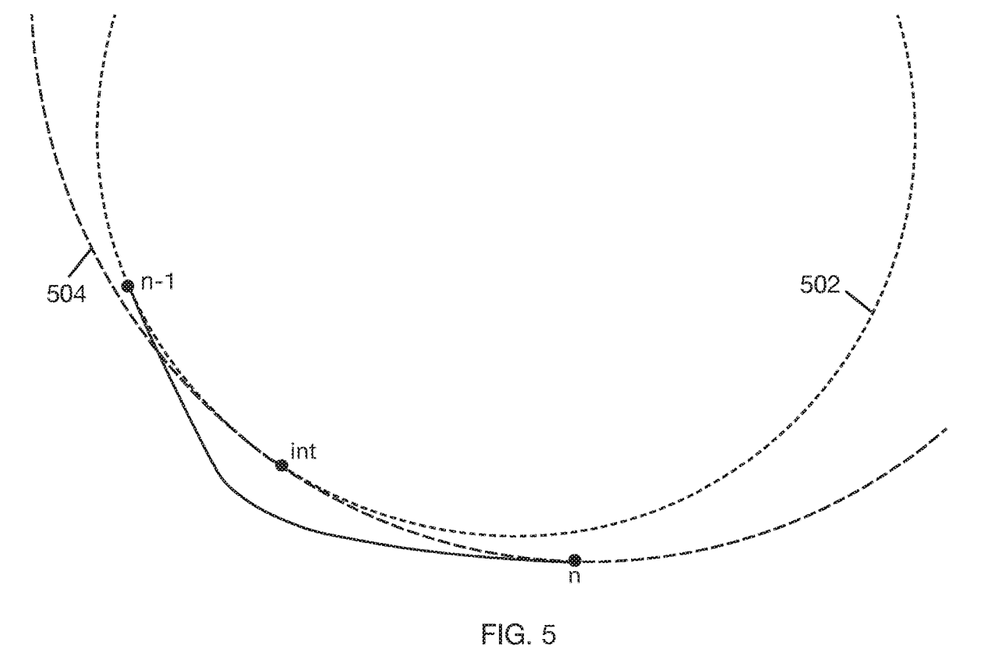
FIG. 5 illustrates a notional station interpolated between a previous and a current survey station.

For illustration purposes, FIG. 5 shows an example of a notional station, int, interpolated between two adjacent survey stations, n−1 and n. In FIG. 5, the curve 504 is tangent to (or defined by) the tangent lines defined by survey vectors (D) at stations int and n, and curve 502 is tangent to (or defined by) the tangent lines defined by survey vectors at stations int and n−1.

Suppose that the notional station, int, interpolated between two adjacent survey stations is at a measured depth $MD_{int}$ with attitude $D_{int}$, then the two circular arcs (e.g., 502, 504 in FIG. 5) joining the adjacent survey stations to the notional station are solved by:

$$DL_1 = \cos^{-1}(D_{n-1} \cdot D_{int}) \quad (4A)$$

$$DL_2 = \cos^{-1}(D_{int} \cdot D_n) \quad (4B)$$

$$P_n = P_{n-1} + (MD_{int} - MD_{n-1}) \cdot \frac{\tan\left(\frac{DL_1}{2}\right)}{DL_1} \cdot (D_{n-1} + D_{int}) + \quad (4C)$$

$$(MD_n - MD_{int}) \cdot \frac{\tan\left(\frac{DL_2}{2}\right)}{DL_2} \cdot (D_{int} + D_n) + \Delta MD \cdot D_n$$

where:
$DL_1$=dogleg angle between attitudes at the previous survey station and notional station
$DL_2$=dogleg angle between attitudes at the notional station and current survey station
$D_{n-1}$=direction vector, or attitude, at the previous survey station
$D_{int}$=direction vector, or attitude, at the notional station
$D_n$=direction vector, or attitude, at the current survey station
$MD_{n-1}$=measured depth at the previous survey station
$MD_{int}$=measured depth at the notional station
$MD_n$=measured depth at the current survey station
$\Delta MD$=residual error in along-hole depth
$P_{n-1}$=position vector at previous survey station
$P_n$=position vector at the current survey station Since the final equation is in vector form, it provides three equations, which can be solved for $\Delta MD$ and $D_{int}$. $D_{int}$ is a unit vector with only two independent unknowns, which can alternately be represented as $Inc_{int}$ and $Az_{int}$. The position of $MD_{int}$ would normally be selected to be midway between $MD_{n-1}$ and $MD_n$, in order to minimize the curvatures of the segments. The mathematics can be made simpler and a non-iterative solution can be found, without significantly degrading accuracy, by replacing each of the two expressions tan(DL/2)/DL with ½.

The embodiment described above may be used if it is acceptable to add interpolated stations to the survey data or if it is acceptable to adjust the attitudes of alternate survey stations only. However, more commonly the preferred solution adjusts the attitude of each survey station in real time without adding additional stations.

In another embodiment of the present disclosure, a method of correcting wellbore positional error includes modeling the interval between three consecutive survey stations—a first station, n−1, a second station, n, and a third station, n+1 (where MD of the first station<MD of the second station<MD of the third station)—as two circular arcs, and applying corrections to the attitude of the second station, n, such that the two circular arcs reflect the actual change in wellbore position between the first station, n−1, and the third station, n+1. In one example, the stationary surveys at the three stations may be available, and the corrections to the second station may be determined using a procedure similar to the one described above for the interpolated notional station—in this case, the second station will correspond to the interpolated notional station, the first station will correspond to the previous station before the interpolated notional station, and the third station will correspond to the current station after the interpolated notational station. In another example, the calculation must be made knowing the well path prior to the second (or current) station, n, to be adjusted, but without knowledge of the third (or next) station, n+1. The most likely solution is therefore found by projecting the well path ahead to a notional station described by $D_{n+1}$ and $P_{n+1}$ in Equations (5A) and (5B), respectively, and adjusting the directional vector $D_n$ using the above technique over the three stations at n−1, n, and n+1. Note that Equation (5A) sets the directional vector at the notional station (or third station), n+1, to be the same as the directional vector at the second station, n. In other examples, a different relationship between the directional vector at the notional (third) station and the second station may be used.

$$D_{n+1} = D_n \quad (5A)$$

$$P_{n+1} = P_n + (MD_n - MD_{n-1}) \cdot D_n \quad (5B)$$

where:
$D_{n+1}$=direction vector, or attitude, at the notional, or third, station
$D_n$=direction vector, or attitude, at the second, or current, station
$P_n$=position vector at the second, or current, station
$P_{n+1}$=position vector at the notional, or third, station
$MD_n$=measured depth at the second, or current, station
$MD_{n-1}$=measured depth at the first, or previous, station In the example described above without knowledge of the third (or next) station, corrections may be applied to the current survey such that corrections needed to future surveys are minimized. In this case, the distance of the wellbore ahead of the second station, n, has not been surveyed yet, but it is possible to estimate the position of the next station (or third station) using secondary data, i.e., supplemental information that is outside of the stationary survey data (such as information from a qualitative orientation tool or sensor placed near the bit or information about how the well was directionally controlled during the drilling, e.g., depths and toolface directions information from slide sheets). This additional information can be used to create a more stable correction at the current station. Thus station "n−1" is the previous (or first) survey station (used for the beginning of the traditional minimum curvature calculation), station "n" is the current (or second) survey station (used as the end point for traditional minimum curvature), and station "n+1" is next (or third) survey station in the future whose position would have to be estimated. By incorporating this information into the solution used at the second (or current) survey station, n, the amount of correction that will be needed when the drill bit finally drills far enough to allow a stationary survey to be taken at the next survey station (n+1) will be reduced. Once the position of the notional future survey station (n+1) has been estimated, then the minimum curvature solution will be similar to the previous embodiment with three stations.

Figure 6:
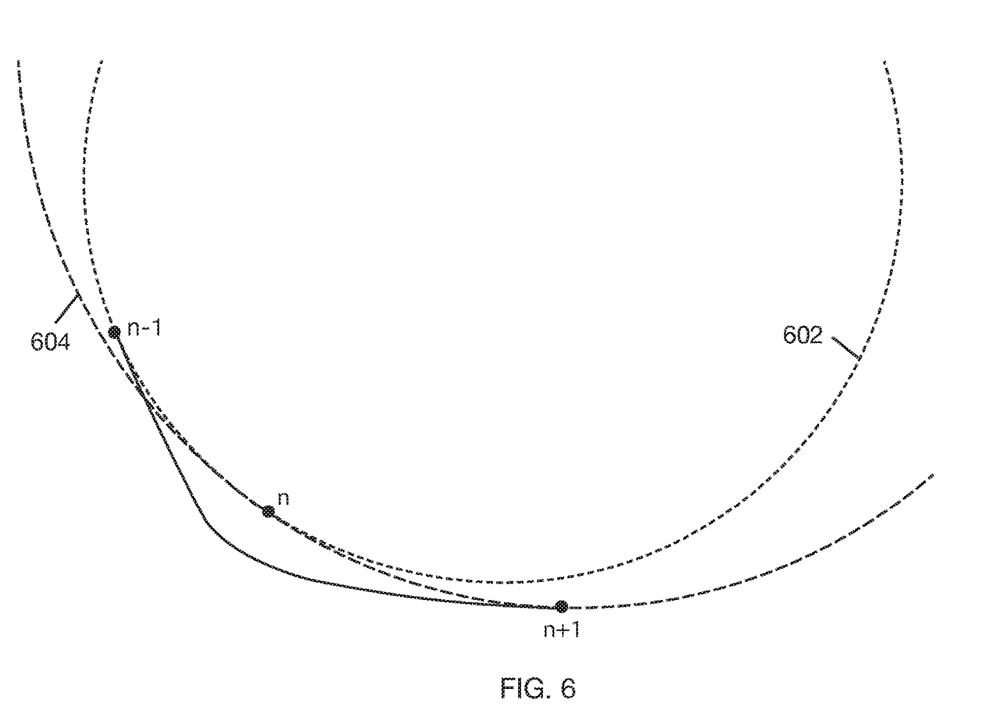
FIG. 6 illustrates a notional station projected ahead of a current survey station.

For illustration purposes, FIG. 6 shows a third station, n+1, projected ahead of a second (or current) station, n. The attitude of the second station, n, has been corrected such that the circular arcs (602, 604) linking the second station to the first (or previous) station, n−1, and third station, n+1, reflect the estimated actual change in wellbore position between the first and third stations. In FIG. 6, curve 604 is tangent to (or defined by) the tangent lines defined by survey vectors (D) at stations n and n+1, and curve 602 is tangent to (or defined by) the tangent lines defined by survey vectors (D) at stations at n−1and n.

Figure 1:
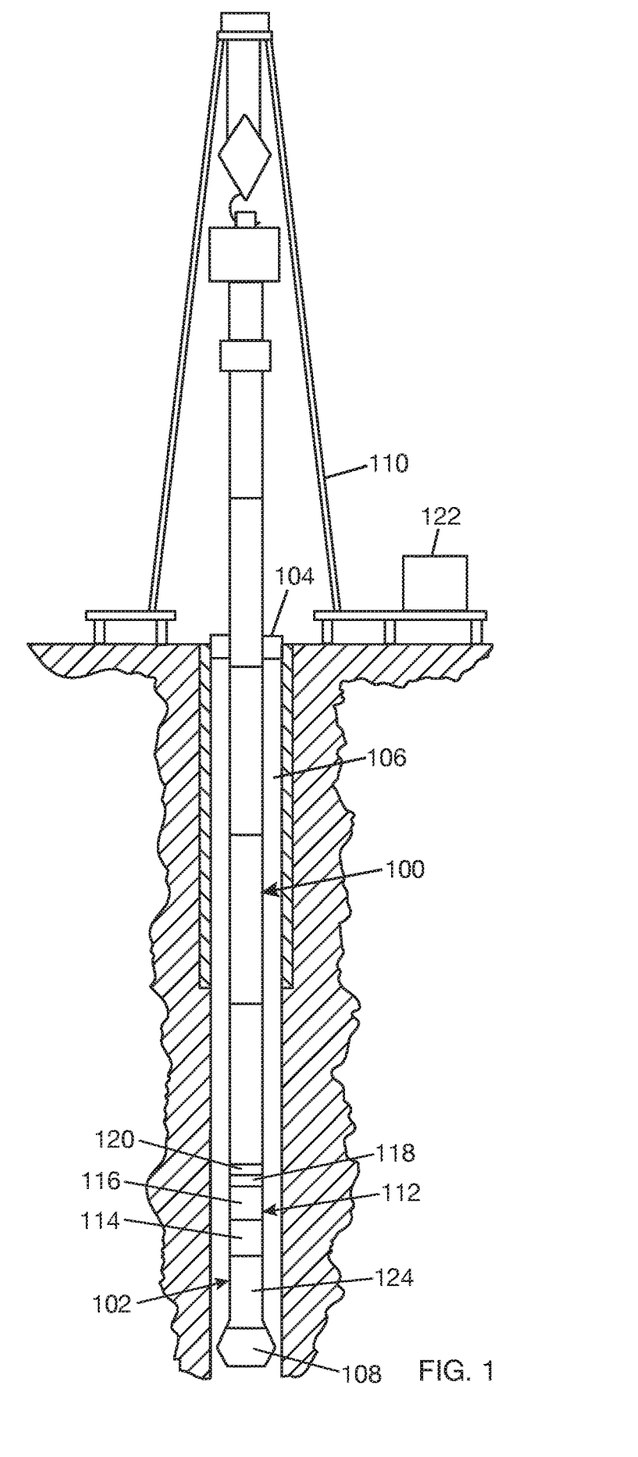
FIG. 1 shows a system for drilling a wellbore.

FIG. 1 shows an example of a drilling environment in which the embodiments described above may be used. In the example drilling environment, a drill string 100 including a bottom hole assembly (BHA) 102 is inserted through a wellhead 104 into a wellbore 106. The drill string 100 may be supported by a derrick assembly 110, as is well known in the art. The BHA 102 includes a drill bit 108 for drilling the wellbore 106. In one embodiment, the BHA 102 further includes a measurements section 112, which includes sensors and other equipment for making survey measurements from the wellb ore 106. In one example, the measurements section 112 may include one or more downhole surveying tools, such as MWD module 114 and logging-while-drilling (LWD) module 116. The measurements section 112 may further include an electronics module 118, which may include a processor and other related computing devices for processing and applying corrections to survey data downhole and storing data. The measurements section 112 may include a communications module 120 for transmitting corrected and/or uncorrected survey data to a recording unit 122 at the surface. The recording unit 122 may be connected to appropriate computing facilities at the surface that allow processing of survey data received from the measurements section 112. The electronics module 118 and communications module 120 may be integrated into any or both of the measurement modules 114, 116. The BHA 102 may include other tools for directional drilling, such as a rotary steerable system (RSS) 124. The RSS 124 may also include devices for making downhole measurements.

Figure 2:
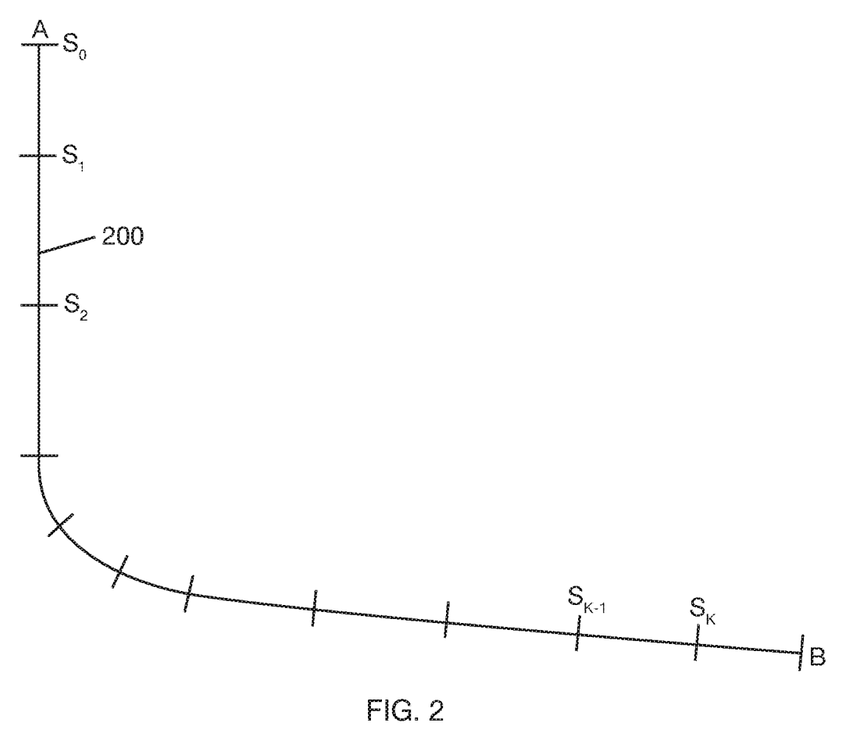
FIG. 2 shows a well path with survey stations.

In accordance with the present disclosure, a method of drilling a wellbore, such as wellbore 106, to a target involves making survey measurements along the wellbore. The survey measurements may be made using any known MWD and/or LWD techniques known in the art. The method may start at any point in the wellbore with a known position and a known (or assumed) orientation. For example, the starting point could be at the wellhead, or at a kickoff point, i.e., where deflection of the wellbore from the vertical starts, or at the bottom of a casing in the wellbore, or at any other desired point in the wellbore with a known position. For illustration purposes, FIG. 2 shows an example well path 200 from a wellhead A to a target B. The starting point, $S_0$, may be at the wellhead A or at another point along the well path. Subsequent survey stations, $S_1, S_2, \ldots, S_{k-1}, S_k$, are located along the well path. The number of survey stations between the starting point, $S_0$, and the target B will depend on the length of the wellbore between these points. The spacing between these survey stations will typically be around 90 feet (equivalent to the length of three drill pipes), but may be as small as 30 feet (equivalent to the length of a single drill pipe) in sections of the well path with strong curvature. The spacing between survey stations may be coordinated with the length of the drill pipe because stationary surveys can be taken when drilling is paused to allow addition of drill pipes to the drill string in the wellbore. Such stationary surveys are typically less noisy than surveys taken while drilling. The method may include drilling from one survey station to the next and making a measurement at each survey station after such drilling. The method may also include making additional survey measurements while drilling from one survey station to the next. The method includes modifying the measured attitudes at survey stations to ensure that modeled well paths between adjacent survey stations reflect true change in wellbore position between the adjacent survey stations, as described above. The method, as described herein, enables positional accuracy equivalent to the ones achievable by high-accuracy methods, such as described in the background, without the need to integrate numerous additional data into the survey record. The corrected attitudes may be used to define the trajectory of the wellbore and enable accurate steering of the wellbore to the target. Alternately, the corrected attitudes may be used for characterizing the well path after drilling.

Figure 3A:
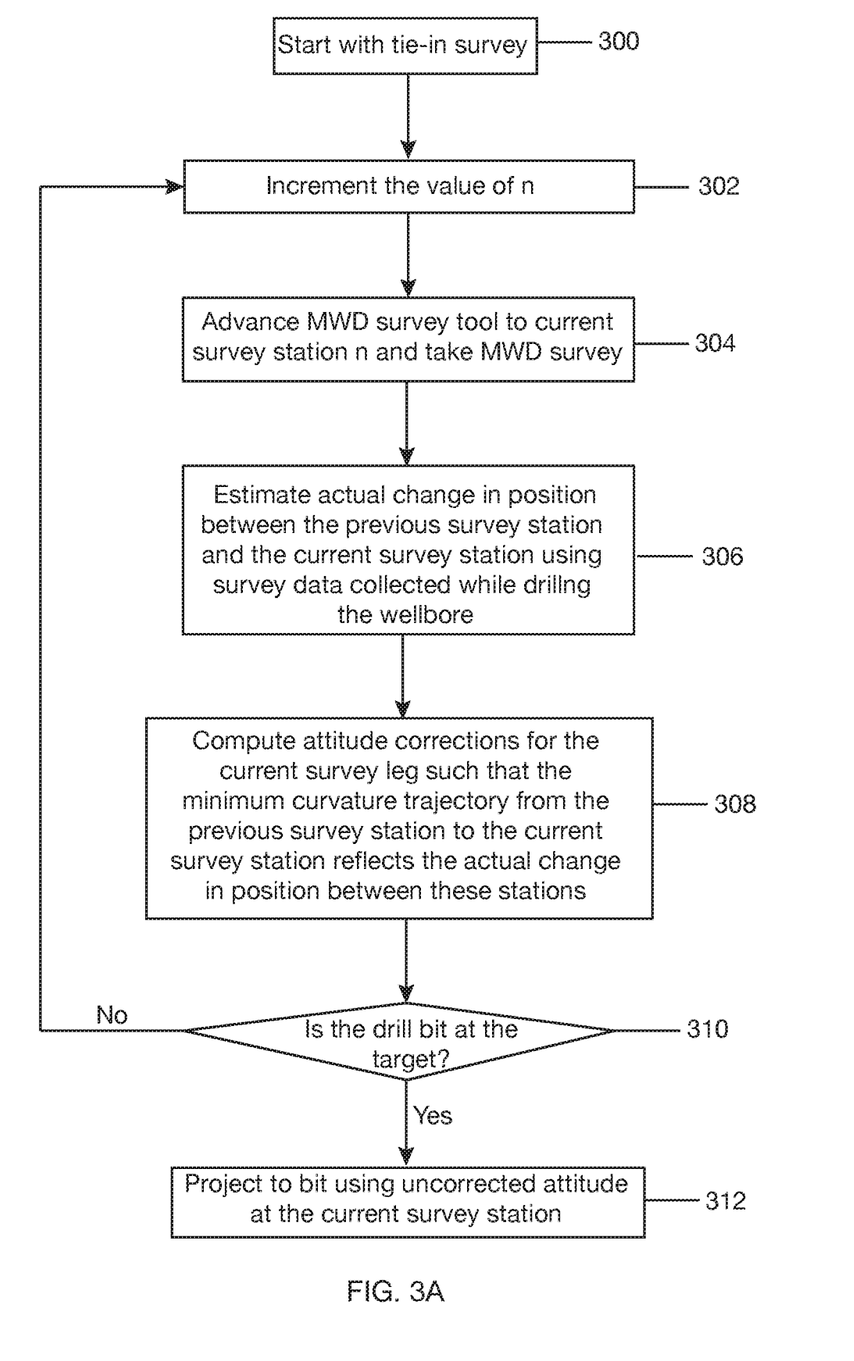
FIG. 3A is a flowchart illustrating a method of drilling a wellbore to a target, according to one embodiment.
Figure 3B:
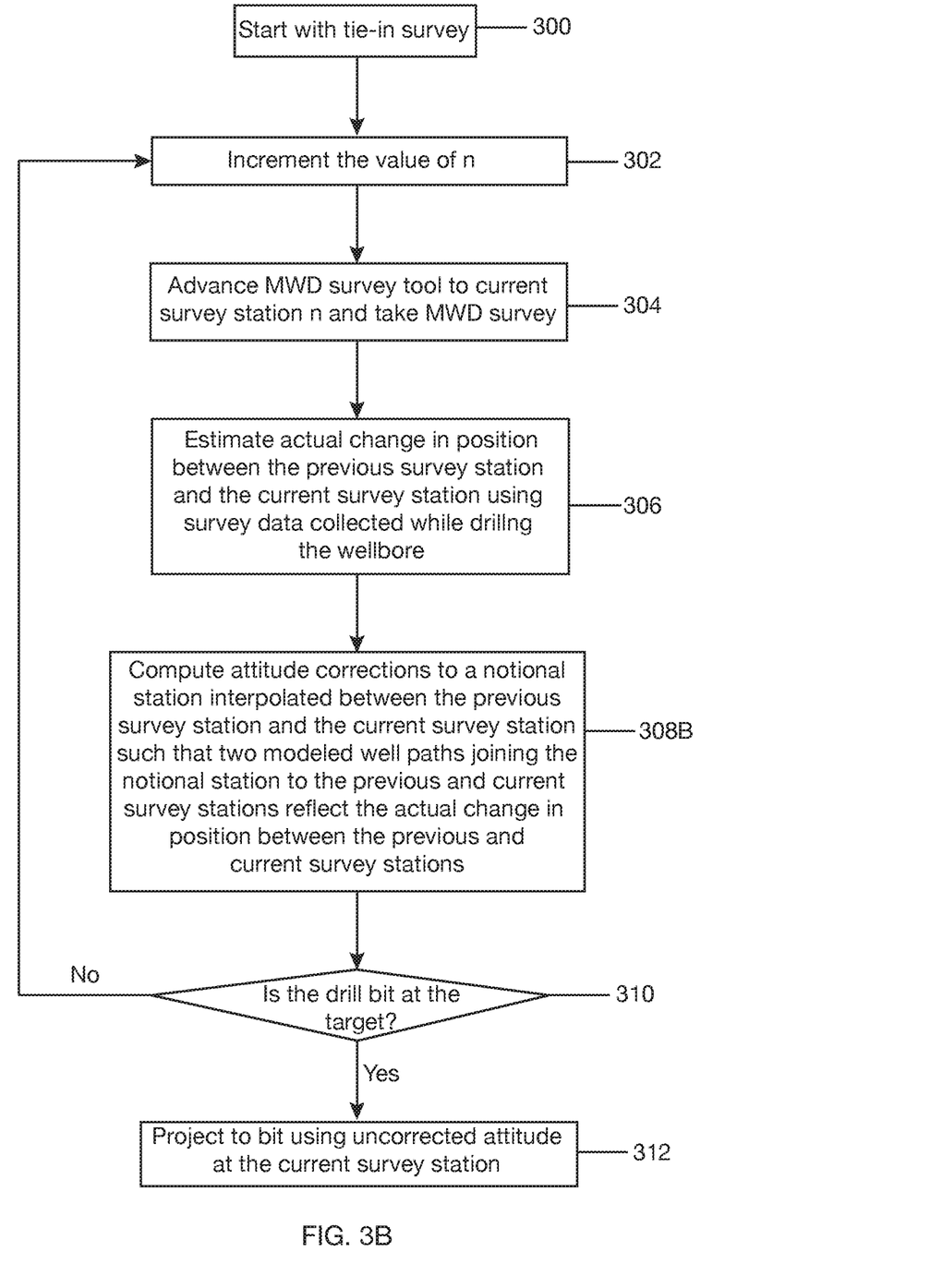
FIG. 3B is a flowchart illustrating a method of drilling a wellbore to a target, according to another embodiment.
Figure 3C:
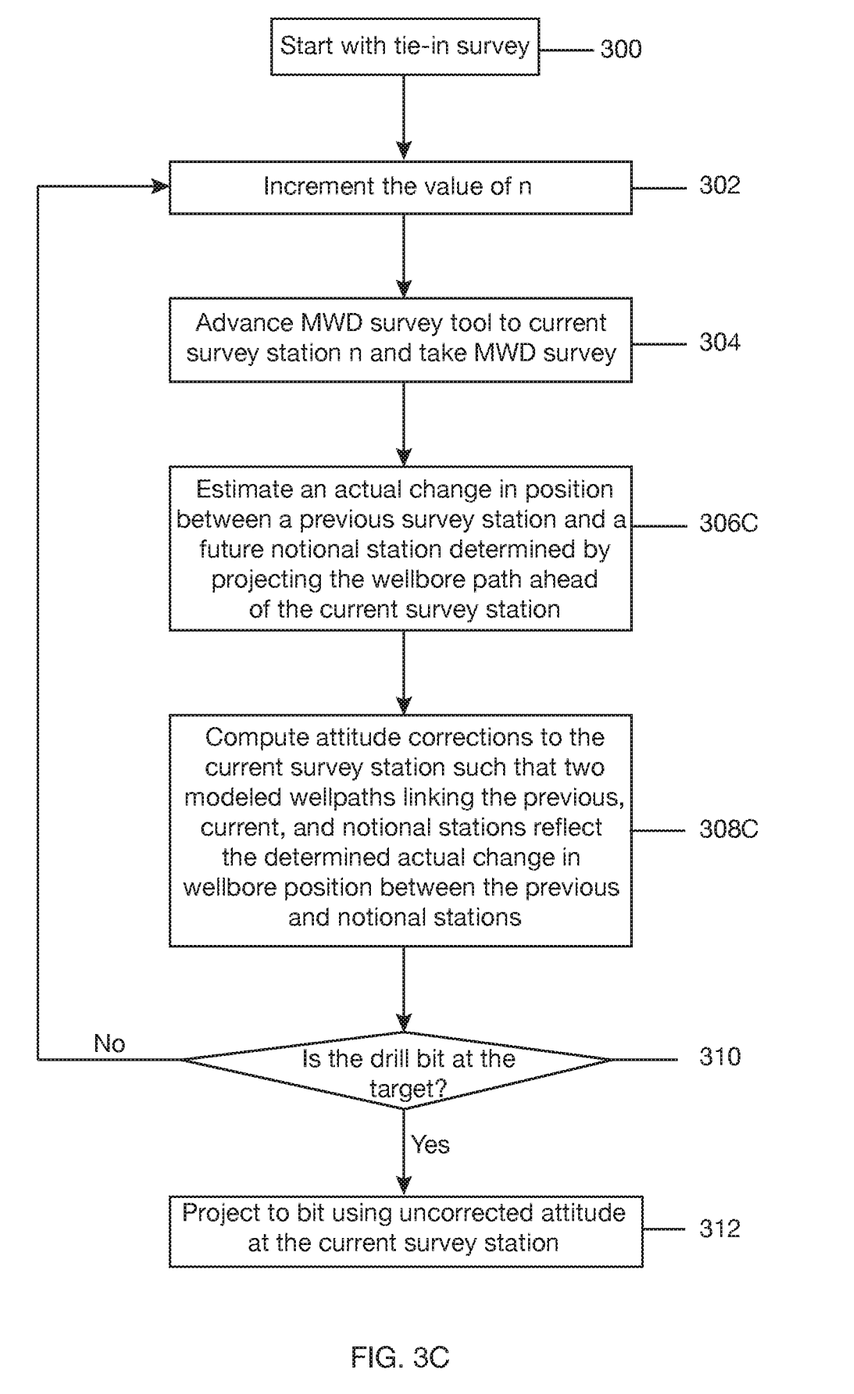
FIG. 3C is a flowchart illustrating a method of drilling a wellbore to a target, according to another embodiment.

FIG. 3A is a flowchart illustrating one practical implementation of a method of drilling to a target according to the present disclosure. The process may start at 300 at any point in the wellbore with a known position and a known (or assumed orientation). That known point where everything begins is the tie-in survey. The process may use an index n to keep track of the current survey station. In the next step 302, the index n is incremented by 1, and a downhole surveying tool, e.g., MWD module 114 in FIG. 1, advances to the next survey station along the wellbore. In one embodiment, advancing the downhole surveying tool to the next survey station may involve drilling the wellb ore to the next survey station. In the next step 304, a new survey measurement is made at the current survey station n using the downhole surveying tool. In the next step 306, the actual change in position between the previous survey station, n−1, and the current survey station, n, is estimated using survey information available between the previous survey station and the current survey station. Some examples of how the actual change can be estimated will be discussed below. In the next step 308, attitude corrections for the current survey leg are computed such that the minimum curvature trajectory from the previous survey station n−1 to the current survey station n reflects the actual change in wellbore position between the two stations. Variations to the workflow in FIG. 3A are possible depending on the wellbore positional error correction method used in the workflow. In general, any of the wellbore positional error correction methods described above may be used. FIGS. 3B and 3C show examples of variations to the workflow of FIG. 3A. In FIG. 3B, step 308B (corresponding to step 308 in FIG. 3A) is based on applying corrections to a notional station interpolated between two survey stations. In FIG. 3C, step 308C (corresponding to step 308 in FIG. 3A) is based on applying corrections to the current survey station taking into account a future survey station, and the preceding step 306C (corresponding to step 306 in FIG. 3A) involves estimating an actual change in position between the previous station and a future notional station determined by projecting the wellbore path ahead of the current survey station. Another variant not shown in the drawings may involve repeating step 304 such that three actual surveys are available as input for the wellbore positional error correction method in step 308C. That is, instead of using a future notional station, an actual third station where a survey measurement is taken using a downhole surveying tool may be used.

Returning to FIG. 3A, in the next step 310, the position of the current survey station, n, is compared to the target to see if the drill bit is at the target. If the drill bit is not at the target, steps 302 to 310 are repeated. In one embodiment, before repeating steps 302 to 310, steering parameters for a wellbore section to be drilled is determined using the corrected attitudes from step 308. As mentioned above, step 302 may involve drilling the wellbore to the next survey station. The corrected attitudes of step 308 may be used to determine a wellbore trajectory that accounts for actual change in wellbore position between survey stations, which can be used to make steering decisions while drilling the wellbore to the next survey station according to step 302. On the other hand, if the drill bit is at the target, the corrected projection to bit, i.e., corrected distance to drill the bit from the current survey station, is computed at 312. Corrected projection to bit, $P_{bit}$, from the current survey station, n, can be computed by extrapolation as follows:

$$P_{bit} = P_n + DTB \cdot D_n \quad (6)$$

where:
$P_{bit}$=corrected projection to bit
$P_n$=position vector at the current survey station n
DTB=distance from the surveying tool to the front of the drill bit
$D_n$=direction vector, or attitude, at the current survey station The correction to bit is used to estimate the position of the hole that has been drilled but where there might not be survey measurements. Due to the presence of other drilling tools in the wellbore, the surveying instrument does not make it all the way down to the bottom of the wellbore. Therefore, it is necessary to estimate what the orientation of this final segment of the wellbore would be.

Steps 306 through 310 (or variants thereof) may be carried out in an appropriate module in the BHA, or parts or all of steps 306 through 310 (or variants thereof) may be carried out with appropriate processing unit(s) or computer(s) at a surface location.

Determining Actual Change in Position Using Continuous Survey Data Method

According to one embodiment, the actual change in position from the previous survey station to the current survey station, n, in step 306 may be estimated from continuous survey measurements. The continuous survey measurements are taken while drilling from the previous survey station, n−1, to the current survey station, n. Although the survey is described as continuous, in practice it just means that the continuous survey employs a higher sampling rate than the actual survey stations (or provides additional survey data points between the survey stations). The continuous survey is separate from the stationary (or static) survey measurements that are made at survey stations (step 304). The continuous survey measurements typically include measured depth, inclination, and azimuth data. The capability to make the continuous survey measurements may be provided by any suitable tool, such as a continuous inclination survey tool, in the BHA.

For each survey interval from the previous survey station, n−1, to the current survey station, n, the following information is needed: continuous inclination and/or azimuth sequence $D(md_m)$, where $MD_{n-1} \leq md_m \leq MD_n$, m=1 ... M, where MD is measurement depth. To compute the actual change in wellbore position, outliers from the M values of $D(md_m)$ are removed. Then, the corresponding change in position from the previous station, n−1, to the current station, n, is computed. Data outliers can be removed by low-pass filtering, resampling, spline fitting, or by other means known in the art. The output of this computation is the change in position from the previous station, n−1, to the current station, n, denoted as $P_n - P_{n-1}$.

Pre-Processing of Continuous Survey Data: It should be noted that the continuous survey data may be subject to additional error sources not present in stationary MWD survey. Vibration during the drilling process may introduce noise to the measurement. In extreme cases, drilling tools such as agitators may be used that intentionally induce axial vibrations by converting energy from mud flow into linear motion. Single sensor readings will have increased susceptibility to residual calibration errors on the sensor being used for inclination measurements, as well as potential biases from assumed values of total gravity references. These error sources can cause discrepancies between the static MWD surveys and the data obtained via continuous inclination. To enable accurate estimation of the actual change in position between two adjacent stations, it is necessary to process the continuous inclination data prior to its use in the correction method described above so that the benefits of including additional curvature in the survey are not outweighed by the detriments of including poor quality data.

In one embodiment, pre-processing of continuous survey data (measured depth, inclination, azimuth) includes data conditioning, applying adjustments to the depth data, and applying adjustments to the continuous orientation data.

Data Conditioning: In one embodiment, statistical outliers are removed from the continuous survey dataset. Noise-reduction functions are also applied to the dataset. This may include applying a smoothing function, resampling the data at a more convenient rate for analysis, or creating synthetic data as needed. The output of this step is a new continuous survey dataset (of the form measured depth, inclination, and azimuth) that is more amenable to analysis.

Adjusting Depth Data: The measured depth data is adjusted to better correlate with the stationary survey depths. This process may include evaluating drilling parameters that can correlate sensor depth to survey depths (such as bit depth, pump pressure, block position, and slide-rotate patterns), and it may include looking at residuals when subtracting the stationary survey data from the continuous survey data. These adjustments may be made across the entire dataset or across smaller subsets of the dataset as small as a single point.

Adjusting Continuous Orientation Data: The continuous orientation data (inclination and azimuth) is adjusted to better correlate with the stationary survey depths. Where discrepancies exist, the stationary survey will be assumed to be of superior quality to the continuous data. For inclination, this may include calculating an offset across the whole set or data or calculating multiple offsets to be applied to subsets of data as small as individual points. For azimuth data, the same treatment that is applied to the inclination data may be applied or the azimuth may be replaced by taking interpolated azimuths from the stationary survey set.

Determining Actual Change in Position between Stations Using Slide Sheet Method A significant source of true vertical depth (TVD) errors is due to the widespread use of mud motors in directional drilling. Mud motors make use of a bend in the BHA. Consider a bend that causes a wellbore curvature of 5 degrees per 100 feet. If the drill string is rotated, the bend rotates in all directions, resulting in a straight hole or a small curvature in a direction which results from gravity and the BHA design. If on the other hand the drill string does not rotate, but the motor is driven by the mud flow, this results in a curve of 5 degrees per 100 feet. By setting the orientation ("toolface") of the bend, the curvature of the wellbore can be oriented in the desired direction. In practice, this means that the wellbore is a sequence of "rotate" sections in which the direction is constant or slightly curved in a fixed direction and curved "slide" sections in which the direction changes in the direction of the toolface setting. These alternating slide and rotate sections are not accounted for in the standard minimum curvature representation of the wellbore trajectory.

According to the present disclosure, in another embodiment, for step 306, the actual change in position from the previous survey station, n−1, to the current survey station, n, may be computed from slide sheets. A slide sheet is a record of whether the well was intentionally deviated ("sliding" with a motor) or whether it was drilled with the assumption that the path would be straight (rotary drilling). By using a record of the intended steering directions, the curvature of the wellb ore between the stationary survey stations can be estimated.

For each survey interval from the previous survey station, n−1, to the current survey station, the following information from the slide sheets is needed: (1) "Slide" or "Rotate" mode for each segment of the interval drilled in a single mode; (2) the measured depths at each of the M switch-overs between slide and rotate segments for the interval, $MD_{n-1} \leq md_m < MD_n$, m=1 . . . M, and (3) the toolface reported for each "Slide" segment.

To compute the actual change in position, each sliding or rotating segment is modeled by a circular arc. Each circular arc is defined by its starting and ending depths $MD_{m-1}$ and $MD_m$, starting attitude $D_{m-1}$, starting toolface direction $T_{m-1}$, and rate of curvature $C_m$. The ending attitude of a segment $D_m$ can be computed from Equations (7A) to (7C). The final direction vector $D_m$ is found by rotation of the initial wellbore vector $D_{m-1}$ and unit vector $Y_{m-1}$ about the pole by angle $R_m$.

$$R_m = C_m \cdot (md_m - md_{m-1}) \quad (7A)$$

$$Y_{m-1} = |\cos(I_{m-1}) \cdot \cos(A_{m-1}) \cdot \cos(T_{m-1}) - \sin(A_{m-1}) \cdot \sin(T_{m-1}), \cos(I_{m-1}) \cdot \sin(A_{m-1}) \cdot \cos(T_{m-1}) + \cos(A_{m-1}) \cdot \sin(T_{m-1}), -\sin(I_{m-1}) \cdot \cos(T_{m-1})| \quad (7B)$$

$$D_m = D_{m-1} \cdot \cos(R_m) + Y_{m-1} \cdot \sin(R_m) \quad (7C)$$

where
$R_m$=rotation angle
$C_m$=rate of curvature
$md_m$=ending measured depth
$md_{m-1}$=starting measured depth
$Y_{m-1}$=unit vector normal to the initial wellbore vector Dm−1 and normal to the pole about which the wellbore interval curves
$I_{m-1}$=Starting inclination
$A_{m-1}$=Starting azimuth
$T_{m-1}$=starting toolface direction
$D_m$=ending attitude of a segment
$D_{m-1}$=starting attitude of a segment Given values for each of the parameters, final direction vectors can be found for all of the segments within an interval by solving sequentially from the first segment to the last. Final position vectors $P_m$ can be obtained by solving the circular arc formulas for each segment, the last such vector giving the current position $P_n$ at the end of the interval.

Several different computation modes may be employed, depending on the nature of the survey interval.

Sliding Segments Only Mode: If the survey interval consists of a number of sliding segments but no rotating segments, all of the depths and toolfaces are obtained from slide sheet data. The only unknown is the rate of curvature $C_M$, which can be assumed to be the same during each sliding segment. For any curvature value $C_M$, a solution can be found for the final attitude vector of the interval $D_M$. The curvature value $C_M$ which results in a final attitude vector closest to the measured attitude $D_n$ at the end of the interval is taken to be the solution. The optimum value for $C_M$ may be found by methods known in the art, such as Newton-Raphson iteration.

Sliding and Rotating Segments Mode: If the survey interval contains both sliding and rotating segments, the curvatures of each mode are unknown. It may be assumed that all sliding segments have the same curvature $C_S$, and all rotating segments have the same curvature $C_R$. If the rotating segments are assumed to have toolface zero (rotating mode curvature is restricted to the vertical plane), the optimum values of $C_S$ and $C_R$ will match the final attitude exactly. In this case the sliding mode matches all left/right deviation in the horizontal plane, and the rotating mode curvature matches the residual up/down deviation in the vertical plane. As the computation is non-linear, iterative methods are again required to find the solution.

If the rotating mode segments are allowed to deviate out of vertical, then the rotating mode toolface $T_R$ represents a third unknown. In this case the problem cannot be solved using data from a single interval or stand, as the final measured attitude provides only two independent equations. It can be solved using data from the current interval and the previous interval, finding the parameters which best fit to both measured attitudes $D_{n-1}$ and $D_n$.

For actively controlled steering tools which generate different curvatures in different segments within one interval, the ratio of segment curvatures should be provided (e.g., one segment at 50% and another at 100%).

There are certain limitations to these techniques. If all sliding toolfaces and rotating toolface coincide, it is not possible to find a unique solution. Under these circumstances one additional piece of information must be provided, such as either the sliding or rotating curvature.

It should be noted that slide sheets report one toolface per segment. A segment drilled with constant toolface does not generally follow a circular arc; however, the solutions provided above model each segment as a circular arc defined by its initial toolface direction. In order to limit systematic errors, the toolface reported on the slide sheet can be assigned to the midpoint of the corresponding circular arc. It is then possible to compute a starting toolface for use in the above calculations.

While the invention has been described with respect to a limited number of embodiments, those skilled in the art of, having benefit of this disclosure, will appreciate that other embodiments can be devised which do not depart from the scope of the invention as disclosed herein. Accordingly, the scope of the invention should be limited only by the accompanying claims.

The invention claimed is:

1. A method of drilling a wellbore to a target, comprising:
measuring attitudes at least at two of consecutive first, second, and third survey stations along a wellbore using a downhole surveying tool;
determining an actual change in wellbore position between the first and third survey stations; and
applying corrections to the attitude at the second survey station such that two modeled well paths intersect at a corrected position of the second survey station to reflect the determined actual change in wellbore position between the first and third survey stations, wherein:
the corrected position of the second survey station is interpolated between the first survey station and the third survey station;
the first survey station and the second survey station are linked with a first modeled well path of the two modeled well paths;
the second survey station and the third survey station are linked with a second modeled well path of the two modeled well paths; and
the two modeled well paths are circular arcs computed by a minimum curvature method.

2. The method of claim 1, wherein determining the actual change in wellbore position comprises determining the actual change in wellbore position between the first and third survey stations using continuous survey measurements taken during drilling of the wellbore.

3. The method of claim 1, wherein determining the actual change in wellbore position comprises determining the actual change in wellbore position between the first and third survey stations using continuous inclination measurements taken during drilling of the wellbore.

4. The method of claim 1, wherein determining the actual change in wellbore position comprises determining the actual change in wellbore position between the first and third survey stations using depths and toolface directions defining slide intervals during drilling of the wellbore.

5. The method of claim 1, wherein the third survey station is a notional survey station determined by projecting the path of the wellbore ahead of the second survey station.

6. The method of claim 5, wherein determining the actual change in wellbore position comprises determining the actual change in wellbore position between the second and third survey stations using survey data other than stationary survey measurements taken at the survey stations.

7. The method of claim 5, wherein determining the actual change in wellbore position comprises determining the actual change in wellbore position between the second and third survey stations using depths and toolface directions defining slide intervals during drilling of the wellbore.

8. A non-transitory computer-readable medium having instructions stored thereon that, when executed by one or more processors cause the one or more processors to at least:
receive attitudes measured at least at two of consecutive first, second, and third survey stations along a wellbore using a downhole surveying tool;
determine an actual change in wellbore position between the first and third survey stations; and
apply corrections to the attitude at the second survey station such that two modeled well paths to intersect at a corrected position of the second survey station to reflect the determined actual change in wellbore position between the first and third survey stations, wherein:
the corrected position of the second survey station is interpolated between the first survey station and the third survey station;
the first survey station and the second survey station are linked with a first modeled well path of the two modeled well paths;
the second survey station and the third survey station are linked with a second modeled well path of the two modeled well paths; and
the two modeled well paths are circular arcs computed by a minimum curvature method.

9. The non-transitory computer-readable medium of claim 8, wherein the instructions to cause the one or more processors to determine the actual change in wellbore position comprises determining the actual change in wellbore position between the first and third survey stations using continuous survey measurements taken during drilling of the wellbore.

10. The non-transitory computer-readable medium of claim 8, wherein the instructions to cause the one or more processors to determine the actual change in wellbore position comprises determining the actual change in wellbore position between the first and third survey stations using continuous inclination measurements taken during drilling of the wellbore.

11. The non-transitory computer-readable medium of claim 8, wherein the instructions to cause the one or more processors to determine the actual change in wellbore position comprises determining the actual change in wellbore position between the first and third survey stations using depths and toolface directions defining slide intervals during drilling of the wellbore.

12. The non-transitory computer-readable medium of claim 8, wherein the third survey station is a notional survey station determined by projecting the path of the wellbore ahead of the second survey station.

13. The non-transitory computer-readable medium of claim 12, wherein the instructions to cause the one or more processors to determine the actual change in wellbore position comprises determining the actual change in wellbore position between the second and third survey stations using survey data other than stationary survey measurements taken at the survey stations.

14. The non-transitory computer-readable medium of claim 12, wherein the instructions to cause the one or more processors to determine the actual change in wellbore position comprises determining the actual change in wellbore position between the second and third survey stations using depths and toolface directions defining slide intervals during drilling of the wellbore.

15. A method of drilling a wellbore to a target, comprising:
measuring attitudes at adjacent survey stations along a wellbore using a downhole surveying tool;
determining an interpolated wellbore position between the adjacent survey stations; and using the interpolated wellbore position, applying a correction to the attitude measured at one of the adjacent survey stations such that a modeled well path formed by a minimum curvature method joins the one of the adjacent survey stations to the interpolated well position between the adjacent survey stations.

16. The method of claim 15, wherein determining the actual change in wellbore position comprises determining the actual change in wellbore position between the adjacent survey stations using continuous survey measurements taken during drilling of the wellbore.

17. The method of claim 15, wherein determining the actual change in wellbore position comprises determining the actual change in wellbore position between the adjacent survey stations using continuous inclination measurements taken during drilling of the wellbore.

18. The method of claim 15, wherein determining the actual change in wellbore position comprises determining the actual change in wellbore position between a first survey station and a third survey station of the adjacent survey stations using depths and toolface directions defining slide intervals during drilling of the wellbore.

19. A method of drilling a wellbore to a target, comprising:
    measuring attitudes at least at two of consecutive first, second, and third survey stations along a wellbore using a downhole surveying tool;
    determining an actual change in wellbore position between the first and third survey stations; and
    applying corrections to the attitude at the second survey station such that two modeled well paths linking the three consecutive survey stations reflect the determined actual change in wellbore position between the first and third survey stations, wherein:
        the two modeled well paths linking the three stations are circular arcs computed by a minimum curvature method; and
        the third survey station is a notional survey station determined by the two modeled well paths.

20. The method of claim 19, wherein determining the actual change in wellbore position comprises determining the actual change in wellbore position between the second and third survey stations using survey data other than stationary survey measurements taken at the survey stations.

21. The method of claim 19, wherein determining the actual change in wellbore position comprises determining the actual change in wellbore position between the second and third survey stations using depths and toolface directions defining slide intervals during drilling of the wellbore.

22. A non-transitory computer-readable medium having instructions stored thereon that, when executed by one or more processors cause the one or more processors to at least:
    receive attitudes measured at least at two of consecutive first, second, and third survey stations along a wellbore using a downhole surveying tool;
    determine an actual change in wellbore position between the first and third survey stations; and
    apply corrections to the attitude at the second survey station such that two modeled well paths linking the three consecutive survey stations reflect the determined actual change in wellbore position between the first and third survey stations, wherein:
        the two modeled well paths linking the three stations are circular arcs computed by a minimum curvature method; and
        the third survey station is a notional survey station determined by the two modeled well paths.

23. The non-transitory computer-readable medium of claim 22, wherein the instructions to cause the one or more processors to determine the actual change in wellbore position comprises determining the actual change in wellbore position between the second and third survey stations using survey data other than stationary survey measurements taken at the survey stations.

24. The non-transitory computer-readable medium of claim 22, wherein the instructions to cause the one or more processors to determine the actual change in wellbore position comprises determining the actual change in wellbore position between the second and third survey stations using depths and toolface directions defining slide intervals during drilling of the wellbore.

25. The method of claim 1, wherein the first modeled well path is tangent to a tangent line defined by a survey vector at the first survey station.

26. The non-transitory computer-readable medium of claim 8, wherein the first modeled well path is tangent to a tangent line defined by a survey vector at the first survey station.

* * * * *